United States Patent
Kosuge et al.

(10) Patent No.: US 8,311,123 B2
(45) Date of Patent: Nov. 13, 2012

(54) TV SIGNAL PROCESSING CIRCUIT

(75) Inventors: Tetsuo Kosuge, Gunma-ken (JP); Kensuke Fujimura, Shijonawate (JP); Naoki Tanahashi, Osaka (JP)

(73) Assignees: Semiconductor Components Industries, LLC, Phoenix, AZ (US); Sanyo Semiconductor Co., Ltd, Gunma (JP)

( * ) Notice: Subject to any disclaimer, the term of this patent is extended or adjusted under 35 U.S.C. 154(b) by 1383 days.

(21) Appl. No.: 11/946,626

(22) Filed: Nov. 28, 2007

(65) Prior Publication Data
US 2008/0130743 A1 Jun. 5, 2008

(30) Foreign Application Priority Data
Nov. 30, 2006 (JP) .................. 2006-322832

(51) Int. Cl.
*H04N 7/12* (2006.01)
*H04N 7/01* (2006.01)
(52) U.S. Cl. .................... 375/240.25; 348/445
(58) Field of Classification Search ............ 375/240.03, 375/240.12, 240.24, 240.25; 348/445, 458, 348/459
See application file for complete search history.

(56) References Cited

U.S. PATENT DOCUMENTS

| | | | | |
|---|---|---|---|---|
| 5,815,646 A | * | 9/1998 | Purcell et al. | 345/502 |
| 6,349,115 B1 | * | 2/2002 | Tahara et al. | 375/240.26 |
| 6,496,537 B1 | * | 12/2002 | Kranawetter et al. | 375/240.12 |
| 6,668,018 B2 | * | 12/2003 | Pearlstein et al. | 375/240.12 |
| 6,731,686 B1 | * | 5/2004 | Sudharsanan et al. | 375/240.25 |
| 7,720,143 B2 | | 5/2010 | Ichihashi et al. | |
| 2002/0075715 A1 | * | 6/2002 | Kwon | 365/51 |
| 2002/0176508 A1 | * | 11/2002 | Boyce et al. | 375/240.25 |
| 2005/0262510 A1 | * | 11/2005 | Parameswaran et al. | 718/105 |

FOREIGN PATENT DOCUMENTS

| | | |
|---|---|---|
| JP | 5-083533 A | 4/1993 |
| JP | 7-240844 A | 9/1995 |
| JP | 9-261628 A | 10/1997 |
| JP | 11-146291 A | 5/1999 |
| JP | 2003-143602 A | 5/2003 |
| JP | 2005-123783 A | 5/2005 |
| JP | 2005-184788 A | 7/2005 |
| JP | 2005-191690 A | 7/2005 |
| JP | 2006-293693 A | 10/2006 |

OTHER PUBLICATIONS

Japanese Office Action for Application No. 2006-322832, mailed on Jan. 18, 2011 (5 pages).
esp@cenet Patent Abstract for Japanese Publication No. 2003-143602, publication date May 16, 2003. (1 page).
esp@cenet Patent Abstract for Japanese Publication No. 11-146291, publication date May 28, 1999 (1 page).
esp@cenet Patent Abstract for Japanese Publication No. 9-261628, publication date Oct. 3, 1997 (1 page).

(Continued)

Primary Examiner — Hassan Phillips
Assistant Examiner — Saba Tsegaye
(74) Attorney, Agent, or Firm — Osha Liang LLP

(57) ABSTRACT

When data is an HDTV signal, a buffer memory is used as two banks and pipeline processing is performed. When data is an SDTV signal, on the other hand, the buffer memory is used as a bankless buffer memory, and the pipeline processing is not performed.

3 Claims, 7 Drawing Sheets

OTHER PUBLICATIONS esp@cenet Patent Abstract for Japanese Publication No. 2005-191690, publication date Jul. 14, 2005 (1 page).

esp@cenet Patent Abstract for Japanese Publication No. 5-83533, publication date Apr. 2, 1993. (1 page).

esp@cenet Patent Abstract for Japanese Publication No. 2005-123783, publication date May 5, 2005. (1 page).

esp@cenet Patent Abstract for Japanese Publication No. 2006-293693, publication date Oct. 26, 2006. (1 page).

esp@cenet Patent Abstract for Japanese Publication No. 7-240844, publication date Sep. 12, 1995. (1 page).

esp@cenet Patent Abstract for Japanese Publication No. 2005-184788, publication date Jul. 7, 2005. (1 page).

Shigeyuki Okada et al., "LSI for SD (Standard Definition) terrestrial digital television", Sanyo Technical Report, vol. 36, No. 1, Jun. 2004, pp. 45 to 51, with English abstract (5 pages).

* cited by examiner

US 8,311,123 B2

TV SIGNAL PROCESSING CIRCUIT

CROSS-REFERENCE TO RELATED APPLICATION

This application claims priority to Japanese Patent Application No. 2006-322832, filed on Nov. 30, 2006, which is incorporated herein by reference in its entirety.

BACKGROUND

1. Technical Field

The present invention relates to a television (TV) signal processing circuit which performs a decoding processing sequentially in macro block (MB) units concerning an HDTV (High Definition Television) broadcasting signal with a high resolution and an SDTV (Standard Definition Television) broadcasting signal with a low resolution.

2. Related Art

Digital TV broadcasting involves HDTV broadcasting with a high resolution and SDTV broadcasting with a low resolution. It is desirable for a television receiver to be able to achieve receiving and display of both types of broadcasting signals. Also, there are demands that the HDTV broadcasting be displayed in SDTV television receivers (i.e. television receivers adapted to the standard quality TV broadcasting and the conventional NTSC and PAL broadcasting), in which case an HDTV signal is reduced for conversion into an SDTV signal.

In TV broadcasting, which is achieved utilizing coded data, data decoding with regard to a received wave is necessary. In MPEG-2 decoding, for example, pipeline processing is often used so as to increase the decoding efficiency per unit time. In order to perform the pipeline processing, however, a large size buffer memory is required between two consecutive processings, causing an increase in the circuit size. (See "LSI for SD (Standard Definition) terrestrial digital television" by Shigeyuki OKADA et al., Sanyo Technical Report, Vol. 36, No. 1, June 2004, pp. 45 to 51, for example)

On the other hand, as a down decoder (that is a decoder for achieving data reduction), which allows display of an HDTV broadcasting signal in a television receiver adapted to the SDTV broadcasting, performs reduction in pixel components and data reduction in units of MB (macro block) by means of Hadamard transform, it appears that in such a down decoder, an amount of buffer required between processings can be reduced compared to the buffer amount required for a normal decoder.

In this case, however, because down decoding of an SDTV broadcasting signal, not an HDTV broadcasting signal, results in noticeably rough images, it is necessary to retain a normal decoder in the circuit as well. This makes it impossible to configure a circuit with a reduced buffer memory size which can be achieved by down decoding as described above.

SUMMARY

According to the present invention, for HDTV broadcasting, data reduction is performed and pipeline processing is also performed. In the case of SDTV broadcasting, on the other hand, neither data reduction nor pipeline processing is performed. With this structure, the capacity of a buffer memory can be made relatively small and deterioration of image quality caused by data reduction regarding an SDTV signal can be prevented.

BRIEF DESCRIPTION OF THE DRAWINGS

A preferred embodiment of the present invention will be described in detail based on the following figures, wherein.

DETAILED DESCRIPTION

A preferred embodiment of the present invention will be described in detail with reference to the accompanying drawings.

Figure 1:
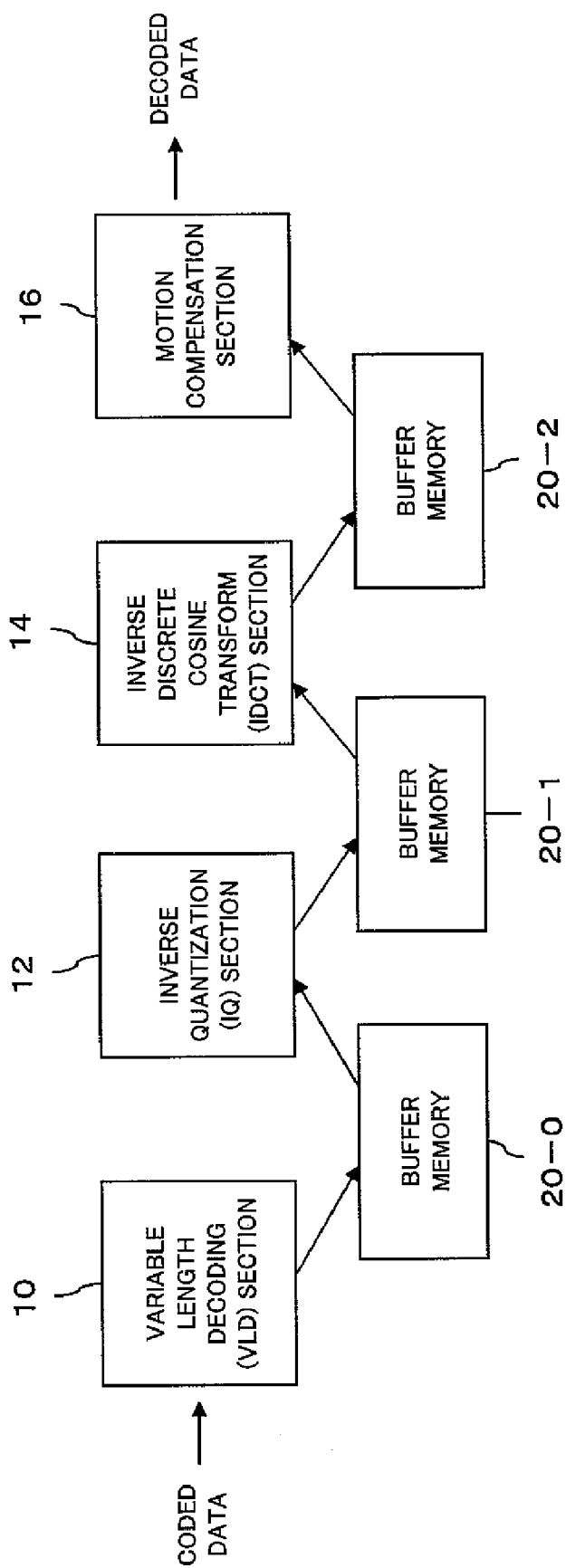
FIG. 1 is a view showing a whole structure of a decoding processing according to an embodiment of the present invention.

FIG. 1 schematically shows a decoding processing procedure of coded image data by means of MPEG-2.

Coded data is first input to a variable length decoding (VLD) section 10 where variable length decoding is performed for a variable length code such as a Huffman code to recover data having a predetermined data length which was achieved before the variable length coding. Then, in an inverse quantization (IQ) section 12, the decoded data is inversely quantized to restore data having bits in a number which was obtained prior to quantization.

The inversely quantized data is further supplied to an inverse discrete cosine transform (IDCT) section 14, where the input data is subjected to inverse discrete cosine transform. The resultant data is then supplied to a motion compensation section 16 where decoding relating to motion compensation is performed to obtain decoded data.

Further, a buffer memory 20 (20-0, 20-1, 20-2) is provided between each pair of the above-described processing sections, and data processed in each processing section is supplied to the subsequent processing section via the buffer memory 20.

Figure 2:
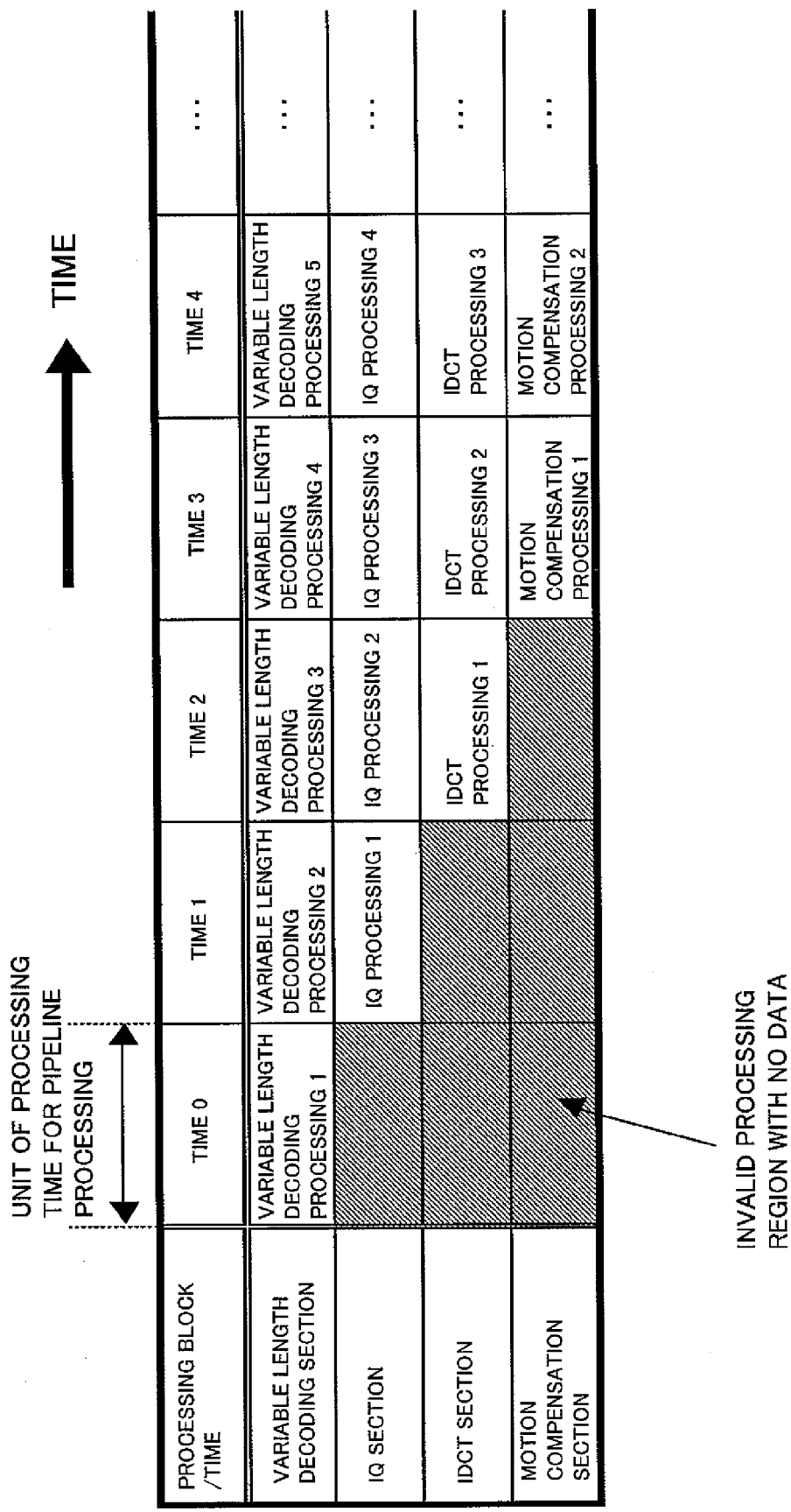
FIG. 2 is a view for explaining the content of a pipeline processing.

Here, when processing an HDTV signal, the processing in each processing section is performed in macro block (MB) units and down decoding by means of data reduction is also performed. In addition, a pipeline processing in which the processing in different stages is performed in parallel is executed. Specifically, as shown in FIG. 2, the variable length decoding section 10 sequentially performs processing of MB1, 2, 3, 4, . . . at times 0, 1, 2, 3 . . . , respectively, which are sequentially shifted by a unit time required for the pipeline processing. The IQ section 12 then sequentially performs processing of MB1, 2, 3, 4, . . . at times 1, 2, 3, 4 . . . , the IDCT section 14 further sequentially performs processing of MB1, 2, 3, 4, . . . at times 2, 3, 4, 5 . . . , and the motion compensation section 16 sequentially performs processing of MB1, 2, 3, 4, . . . at times 3, 4, 5, 6 . . . .

Figure 3:
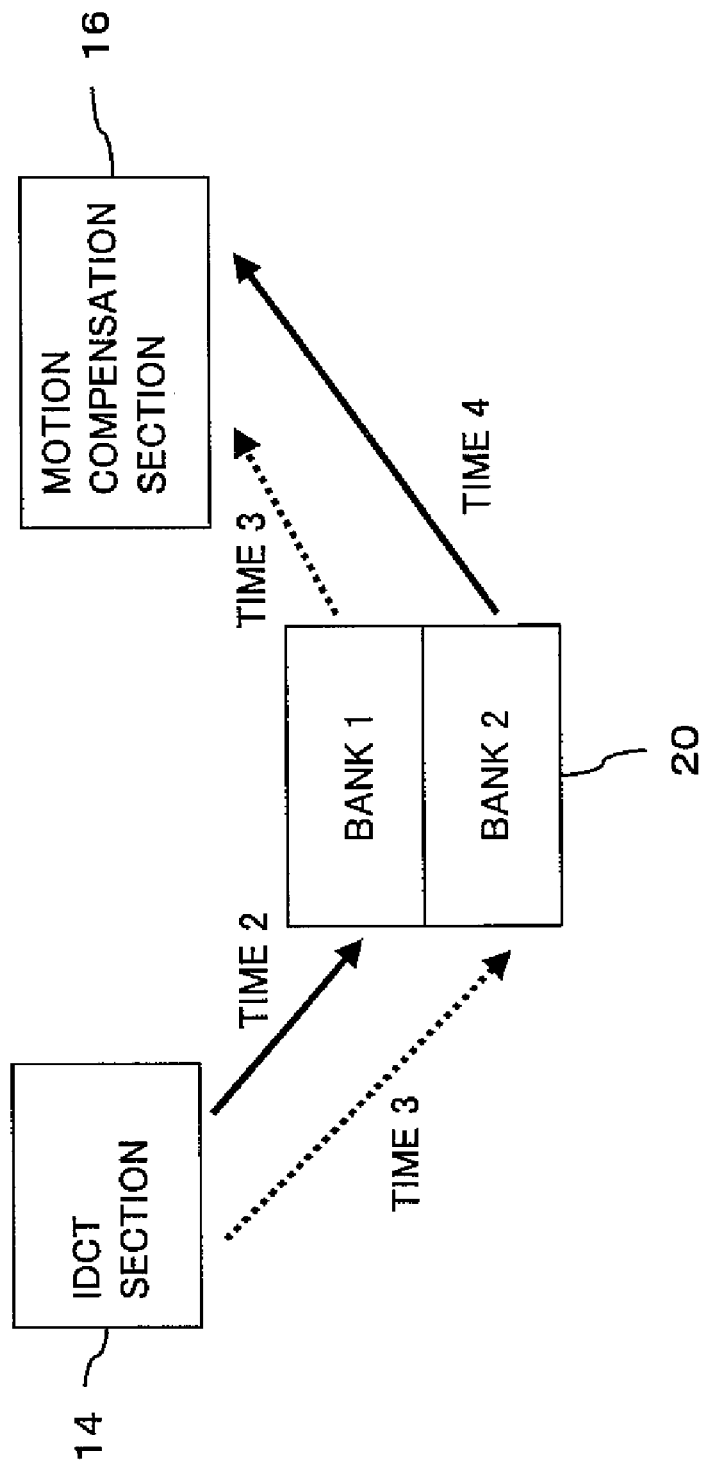
FIG. 3 is a view for explaining the procedure of the pipeline processing.

FIG. 3 illustrates data communication between the IDCT section 14 and the motion compensation section 16. As shown in FIG. 3, the buffer memory 20 including two banks, a bank 1 and a bank 2, is provided between the IDCT section 14 and the motion compensation section 16. With the use of this buffer memory 20, pipeline processing is enabled. Specifically, at time 2, the IDCT section 14 writes the processed data concerning MB1 in the bank 1, and at time 3, the IDCT section 14 writes the processed data concerning MB2 in the bank 2 while the data concerning MB1 read from the bank 1 is supplied to the motion compensation section 16. Then, at time 4, the IDCT section 14 writes the processed data concerning MB3 in the bank 1 while the data concerning MB2 read from the bank 2 is supplied to the motion compensation section 16.

Data communication is also performed in a similar manner between the IQ section 12 and the IDCT section 14 by using the buffer memory including two banks.

Figure 4:
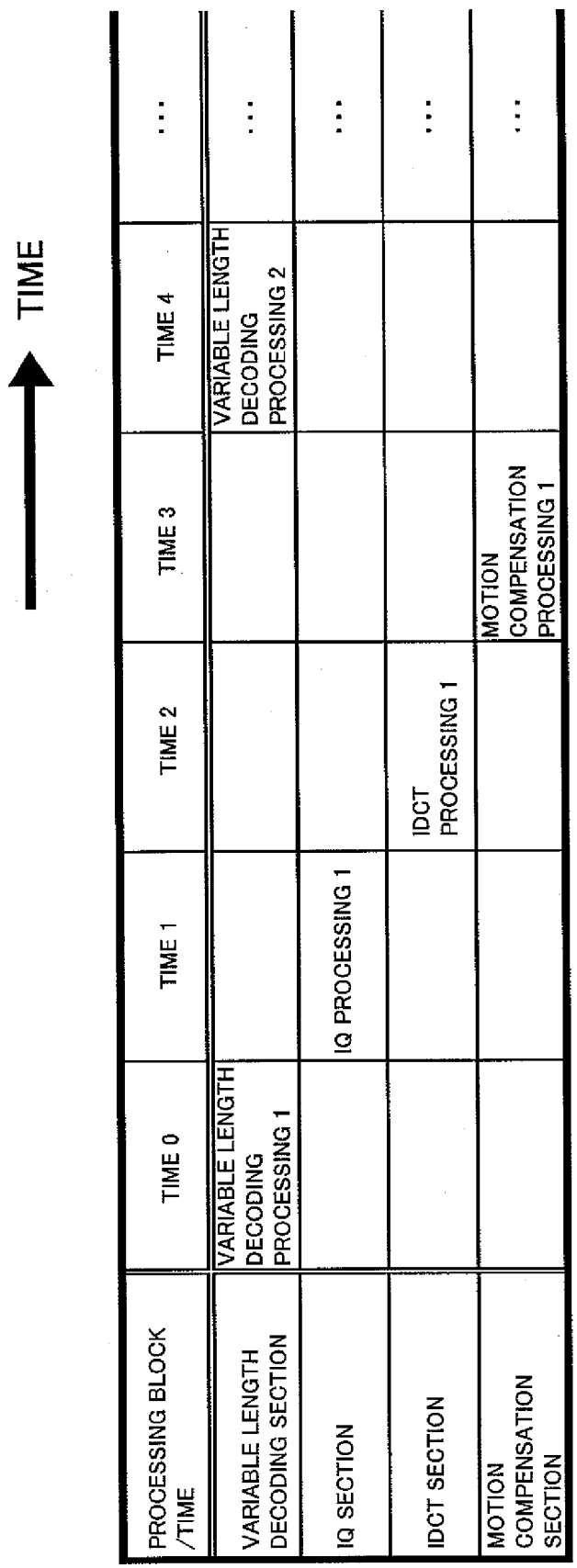
FIG. 4 is a view for explaining the content of a sequential processing.

When processing a SDTV signal, on the other hand, the pipeline processing is not performed and sequential processing is performed. Specifically, as shown in FIG. 4, at times 0, 1, 2, and 3 . . . , the variable length decoding processing, the IQ processing, the IDCT processing, and the motion compensation processing are sequentially performed concerning MB1.

Figure 5:
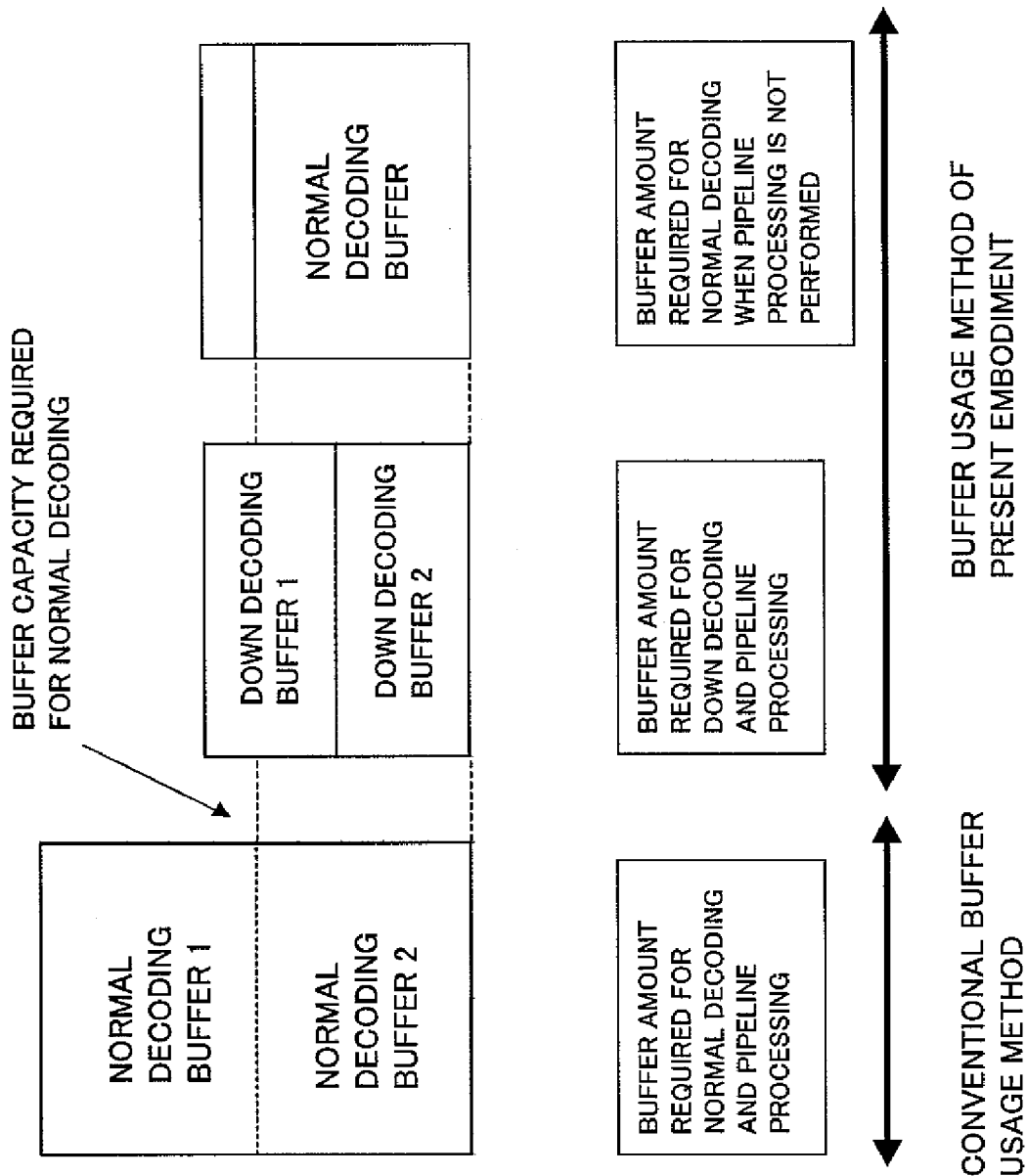
FIG. 5 is a view for explaining usage modes of a buffer memory.

Here, in the present embodiment, as display for SDTV broadcasting is performed with regard to an HDTV signal as well, down decoding is performed for an HDTV signal in the IQ processing, so that the data amount is reduced. Consequently, compared to the buffer capacity required when normal decoding is performed for 1 MB, the capacity required for the buffer memory 20 of the present embodiment is reduced as shown in FIG. 5, although the capacity of the buffer memory 20 of the present embodiment is slightly larger than the capacity of one bank required when normal decoding is performed.

In addition, according to the present embodiment, because, in the case of processing an SDTV signal, the pipeline processing is not performed and therefore the buffer memory 20 can be used as one bank, the capacity of the buffer memory 20 for the normal decoding can be secured.

Figure 6:
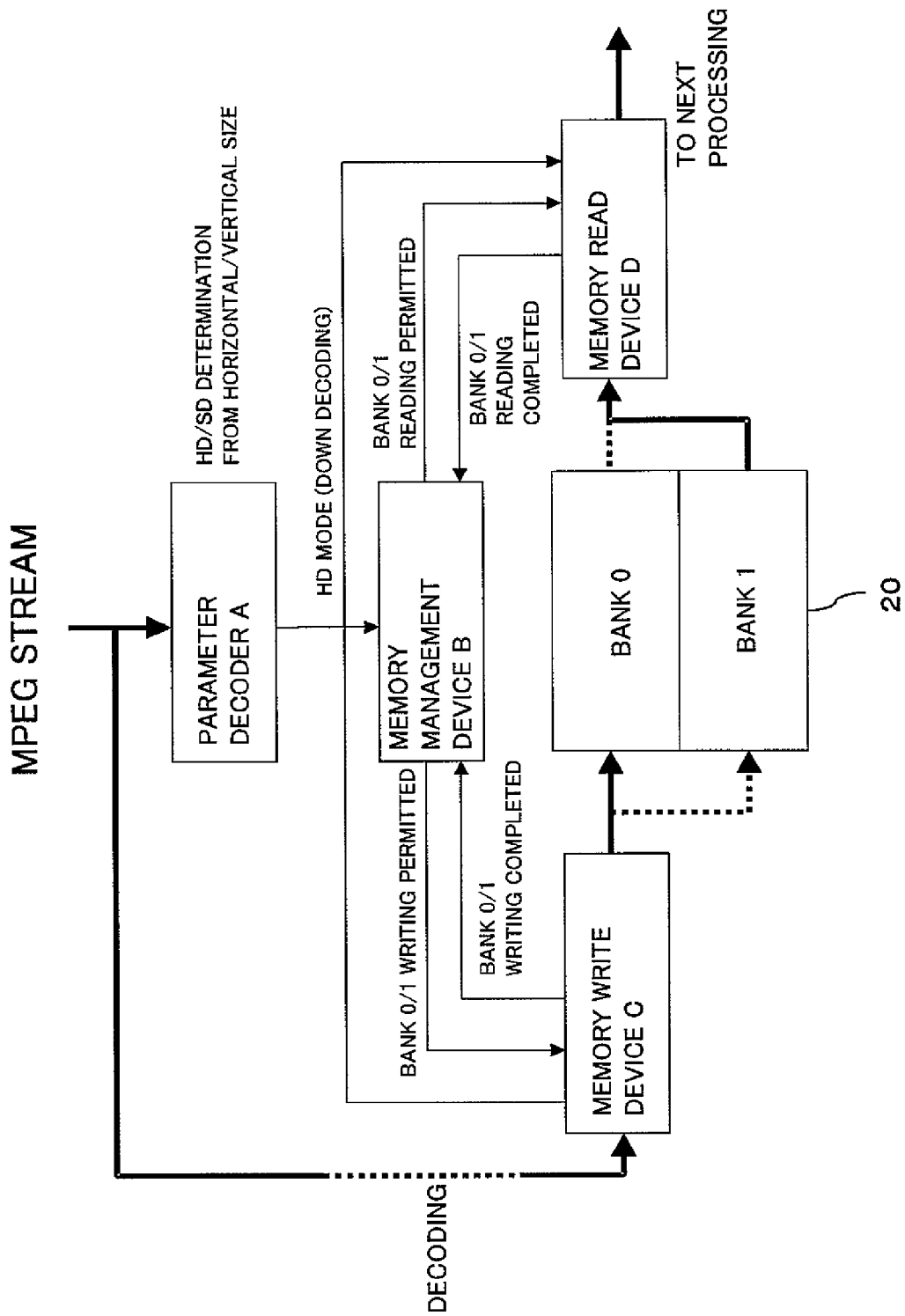
FIG. 6 is a view for explaining use of a buffer memory in an HD mode.

FIG. 6 shows the buffer memory 20 and the configuration for access control thereof. Bit streams (MPEG streams) of coded data are input to a parameter decoder A. The parameter decoder A identifies the size (i.e. the size in the horizontal and vertical directions) of a decoding image from the bit streams, determines whether the image data concerns HDTV or SDTV from the identification result, and then generates an HD/SD control signal. FIG. 6 shows a case where the determination result is HDTV, in which case a signal indicative of an HD mode is output as the HD/SD control signal.

The HD/SD control signal is supplied to a memory management device B. The memory management device B, manages whether read/write processing with respect to the buffer memory 20 is performed in bank units or without banks based on the SD/HD control signal.

The bit streams having been subjected to decoding processing in the previous stage are supplied to a memory write device C, which then writes the bit streams of decoded data in the buffer memory 20. Here, the memory write device C writes the decoded data in the buffer memory 20 which can function either as a two-bank buffer memory or a bankless buffer memory, based on the HD/SD control signal. In the example shown in FIG. 6, the decoded data is written in the buffer memory 20 which serves as two banks.

Here, the memory management device B supplies a signal which enables writing into a bank 0 or a bank 1 of the buffer memory 20 to the memory write device C, which notifies the memory management device B of completion of writing with respect to the bank 0 or the bank 1.

Further, a memory read device D is connected to the buffer memory. The memory read device D can read data from the buffer memory 20 which can function either as a two-bank buffer memory or a bankless buffer memory based on the HD/SD control signal. In the example shown in FIG. 6, the data is read from the buffer memory which serves as a two-bank buffer memory.

Here, the memory management device B supplies a signal which enables reading from the bank 0 or the bank 1 of the buffer memory 20 to the memory read device D, which notifies the memory management device B of completion of reading with respect to the bank 0 or the bank 1.

As described above, in the HD mode, data writing into the buffer memory 20 and the data reading from the buffer memory 20 is controlled. Further, the memory management device B controls the memory write device C and the memory read device D, so that data writing and reading by means of the pipe line processing in bank units as shown in FIG. 3 is performed with respect to the buffer memory 20.

Figure 7:
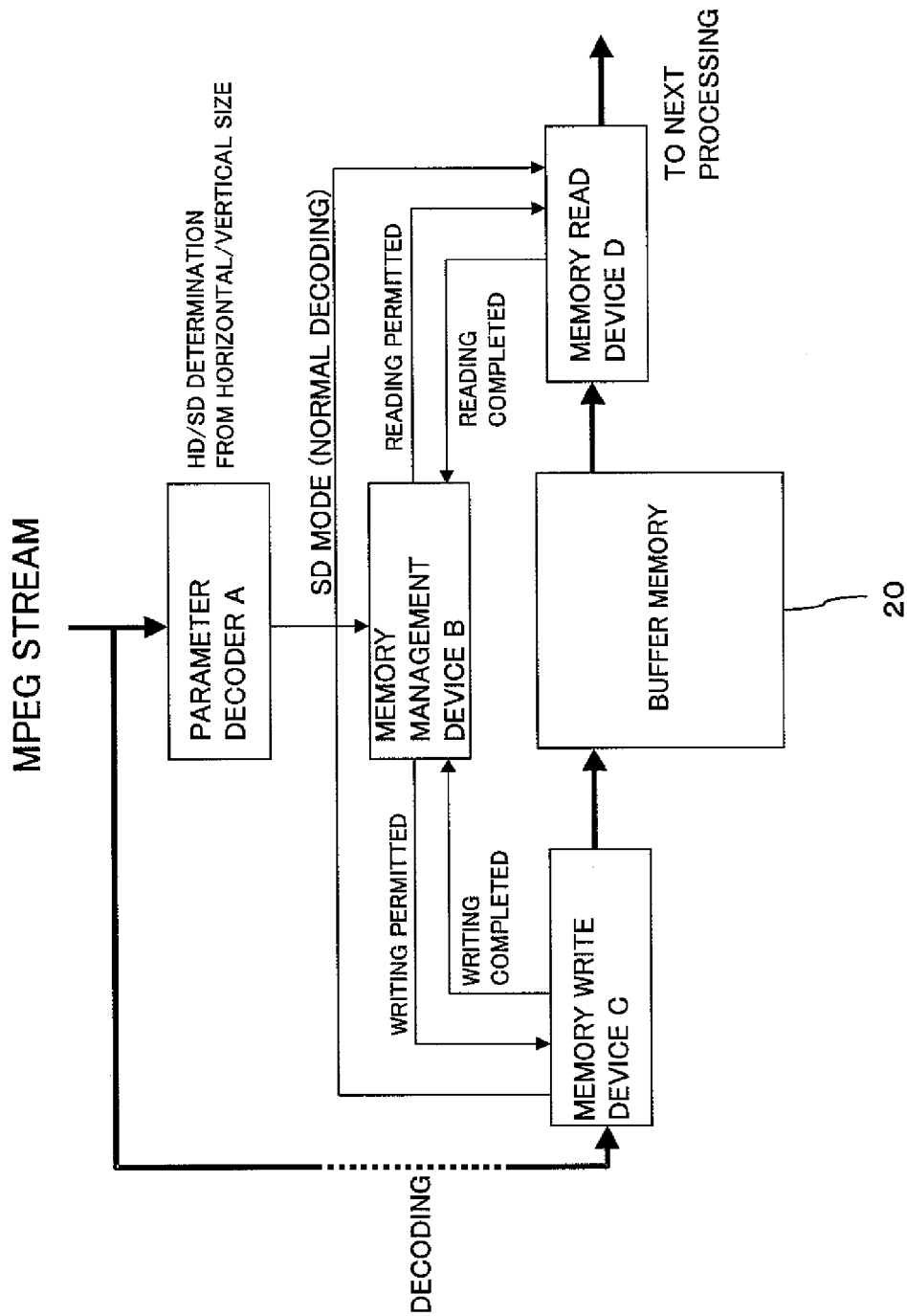
FIG. 7 is a view for explaining use of a buffer memory in an SD mode.

FIG. 7 shows a case of processing an SDTV signal. In this case, the parameter decoder A determines, from the size of an image, that decoded data is an SDTV signal, and notifies the memory management device B, the memory write device C, and the memory read device D of the SD mode, and then these devices are set to perform processing in the SD mode. Then, writing/reading of data is sequentially performed with respect to the buffer memory 20 which functions as a bankless buffer memory. Specifically, as the memory management device B does not provide permission for reading until writing is completed, reading by means of the memory read device D is prohibited until the memory write device C completes writing of data.

As described above, according to the present embodiment, for HDTV broadcasting which requires a large amount of processing, down decoding is performed and the pipeline processing is performed. Specifically, the buffer memory 20 is used as two banks. In this case, a data amount per bank is smaller than that in the normal case where down decoding is not performed. In SDTV broadcasting in which down decoding is not performed, on the other hand, the buffer memory 20 is used simply as one buffer without performing the pipeline processing. With this configuration, it is possible to reduce the capacity of the buffer memory 20 to a relatively small amount and to prevent the image deterioration caused by down coding when processing an SDTV signal.

Further, data reduction is performed in the IQ section 12, as described above. Switching between the HD mode and the SD mode is determined and performed at a hierarchical level which is higher than the MB layer by the above-described parameter decoder A based on the picture size of decoded data.

In addition, image data with a brightness (Y) of 16×16 pixels and a color difference (Cb, Cr) of 8×8 pixels, which is a color display format of 4:2:0 often used in MPEG or the like, is normally used.

While the preferred embodiment of the present invention has been described using specific terms, such description is for illustrative purposes only, and it is to be understood that changes and variations may be made without departing from the spirit or scope of the appended claims.

What is claimed is:

1. A television signal processing circuit which performs a decoding processing sequentially in micro block units for a HDTV signal with a high resolution and a SDTV signal with a low resolution, comprising:

an inverse quantization section which performs inverse quantization processing with respect to data which is coded;

a decoding section which performs decoding processing for data which is inversely quantized;

a motion compensation section which performs motion compensation processing on data which is decoded;

a determination circuit configured to output a control signal for controlling read/write processing of a buffer memory, wherein the control signal indicates whether the television signal is the HDTV signal or the SDTV signal;

a control circuit configured to receive the control signal and manage read/write processing of the buffer memory based on the control signal,
   wherein, for the control signal indicating the HDTV signal, read/write
      processing is performed with two banks, and
   wherein, for the control signal indicating the SDTV signal, read/write
      processing is performed with a single bank, wherein when processing the HDTV signal, data reduction processing is performed in the inverse quantization section and subsequent processing is performed on reduced data, and pipeline processing, in which processing in different stages is performed in parallel, is executed for two micro blocks, wherein when processing the SDTV signal, processing in each stage is sequentially executed without performing the data reduction processing and the pipeline processing, wherein the buffer memory is provided between adjacent processing sections in respective stages, and data processed in a processing section in a previous stage is supplied via the buffer memory to a processing section in a following stage, wherein when processing the HDTV signal, processed data is sequentially written into the two banks, while processed data is read from a bank into which data writing is not being performed and supplied to the processing section in the following stage, and when processing the SDTV signal, processed data is sequentially written into the single bank, while processed data which is written is read and supplied to the processing section in the following stage.

2. The television signal processing circuit according to claim 1, wherein the decoding section performs an inverse discrete cosine transform.

3. A television signal processing circuit which performs a decoding processing sequentially in micro block units for a HDTV signal with a high resolution and a SDTV signal with a low resolution, comprising:

an inverse quantization section which performs inverse quantization processing with respect to data which is coded;

decoding section which performs decoding processing for data which is inversely quantized; and a motion compensation section which performs motion compensation processing on data which is decoded;

a determination circuit configured to output a control signal for controlling read/write processing of a buffer memory, wherein the control signal indicates whether the television signal is the HDTV signal or the SDTV signal; and a control circuit configured to receive the control signal and manage read/write processing of the buffer memory based on the control signal,
   wherein, for the control signal indicating the HDTV signal, read/write
      processing is performed with two banks, and
   wherein, for the control signal indicating the SDTV signal, read/write
      processing is performed with a single bank, wherein when processing the HDTV signal, data reduction processing is performed in the inverse quantization section and subsequent processing is performed on reduced data, and pipeline processing, in which processing in different stages is performed in parallel, is executed for two micro blocks, and wherein when processing the SDTV signal, processing in each stage is sequentially executed without performing the data reduction processing and the pipeline processing.

* * * * *